(12) United States Patent
Throop et al.

(10) Patent No.: US 9,274,941 B1
(45) Date of Patent: Mar. 1, 2016

(54) FACILITATING DATA MIGRATION BETWEEN TIERS

(75) Inventors: Dean D. Throop, Efland, NC (US); Dennis T. Duprey, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 727 days.

(21) Appl. No.: 12/494,622

(22) Filed: Jun. 30, 2009

(51) Int. Cl.
*G06F 12/00* (2006.01)
*G06F 12/02* (2006.01)

(52) U.S. Cl.
CPC .................................. *G06F 12/023* (2013.01)

(58) Field of Classification Search
None
See application file for complete search history.

(56) References Cited

U.S. PATENT DOCUMENTS

| 6,275,898 B1* | 8/2001 | DeKoning | 711/114 |
| 2006/0004957 A1* | 1/2006 | Hand et al. | 711/113 |
| 2007/0011421 A1* | 1/2007 | Keller et al. | 711/165 |

* cited by examiner

*Primary Examiner* — Kevin Verbrugge
*Assistant Examiner* — Craig Goldschmidt
(74) *Attorney, Agent, or Firm* — Krishnendu Gupta; Joseph D'Angelo (57) ABSTRACT

A method, system, and program product comprising, assigning addressable elements of storage devices of a data storage system to groups and subgroups, each subgroup being a member of a respective group of the groups, associating a value with a first group of the groups, wherein the value is derived from attributes of access requests to addressable elements of only a subset of the subgroups that are members of the first group, and based on the value, migrating data of the first group.

15 Claims, 8 Drawing Sheets

FACILITATING DATA MIGRATION BETWEEN TIERS

BACKGROUND

1. Technical Field

This application relates to facilitating data migration between tiers.

2. Description of Related Art

A traditional storage array (herein also referred to as a "disk storage array", "disk array", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

Furthermore, even if a disk storage array uses the fastest disks available, the performance of the array may be unnecessarily limited if only one of those disks may be accessed at a time. In other words, performance of a storage array, whether it is an array of disks, tapes, flash drives, or other storage entities, may also be limited by system constraints, such the number of data transfer buses available in the system and the density of traffic on each bus.

Storage arrays are typically used to provide storage space for one or more computer file systems, databases, applications, and the like. For this and other reasons, it is common for storage arrays to be logically partitioned into chunks of storage space, called logical units, or LUs. This allows a unified storage array to appear as a collection of separate file systems, network drives, and/or Logical Units.

The Storage Array keeps track of the logical unit to physical unit associate in a map. The map associates a host logical unit address with a physical device address. The size of the elements in the map is the coarseness of the map. A map that only has a few entries of large extents is a course grain map. A map that has many entries with small extents is a fine grain map. Fine grain map allow more flexibility but generally are to large for all of it to be contained in memory at once. It is possible to use different mapping granularities for different data to achieve a variety of space/performance trade offs.

SUMMARY OF THE INVENTION

A method, system, and program product comprising, assigning addressable elements of storage devices of a data storage system to groups and subgroups, each subgroup being a member of a respective group of the groups, associating a value with a first group of the groups, wherein the value is derived from attributes of access requests to addressable elements of only a subset of the subgroups that are members of the first group, and based on the value, migrating data of the first group.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Large storage arrays today manage many disks which have historically been identical. However it is possible to use different types of disks and group the like kinds of disks into Tiers based on the performance characteristics of the disks. A group of fast but small disks may be a fast Tier. As well, a group of solid state drives could be another fast Tier. A group of slow but large disks may be a slow Tier. It may be possible to have other Tiers with other properties or constructed from a mix of other disks to achieve a performance or price goal. Storing often referenced, or hot, data on the fast Tier and less often referenced, or cold, data on the slow tier may create a more favorable customer cost profile than storing all data on a single kind of disk.

In addition to a storage tier, there may be a construct referred to as a storage pool. A storage pool ("pool"), as in the case of a group of storage tiers, may be made up of devices with different performance and cost characteristics. As in the case of storage tiers, it may be advantageous to locate the hot or most accessed data to the devices within the storage pool with the best performance characteristics while storing the cold or least accessed data on the devices that have slower performance characteristics. This can lead to a lower cost system having both faster and slower devices, that can emulate the performance of a more expensive system having only faster storage devices.

The current techniques help present a way for the storage array to automatically differentiate the hot data from the cold data on a fine granularity basis while using a limited set of resources to manage what data is stored on what tier through migrating the data. By using a mixture of different types of disks the storage array can have a performance profile more like an array of all fast disk with a cost profile approaching an array with slow disks without customers having to expend time to catagorize and manage tiers of storage. Current techniques can move, or migrate, data to the appropriate tier or devices within or between pools on a fine grain basis while using a rather limited set of resources to manage the tiering or devices in the pool.

Early approaches have either required the customer to only use a single kind of disk or for the customer to manage different tiers of disk by designing which data should be stored on which tier when the data storage definitions are created. Typically, having customers manually manage tiers or pools of storage requires the customer to do a lot of work to categorize their data and to create the storage definitions for where the different categories of storage should be put. Previous approaches required not only categorizing the data and manually placing the data on different tiers or pools, but also keeping the data classification up to date on an ongoing basis to react to changes in customer needs. Some previous approaches have created automated tiering mechanisms or pool management systems but they typically either operate with extremely course maps using course granularity of data or they require a lot of resources to track all the information. Conversely, the current techniques can track data for migration at the finest granularity that the storage system can track while using a small amount of resources.

In effect the current techniques may track the "temperature" of data. In general, temperature corresponds to how often and how recently the data has been accessed. Typically, one of the major problems of creating an automatic mechanism to decide which data to put on which tier or devices within a pool is distinguishing hot data from cold data. In general, hot data refers to data that has been accessed recently and or often. In general, cold data refers to data that has not been accessed recently or often.

Previously, tracking the access information related to the data that used a fine map had been problematic because of the large number of disk results in many entries in the map; e.g., it is not practical to keep track of all references to all data. These current techniques may take advantage of data organized into a hierarchy of storage sizes. All the storage space of a storage array may be grouped together to comprise the storage pool of the array. That pool of storage can be allocated a bucket of data at a time.

A bucket of data may contain many drops; each bucket may know which drops it contains and the drops may know to which bucket they belong. A drop of data may be the smallest size of data that can be tracked and relocated. There can be other levels in the hierarchy as well. Each bucket may be capable of tracking and recording the average number of accesses to all the drops it contains to create an average temperature for the bucket.

The buckets can be sorted by temperature to determine which bucket has, on average, the hottest drops and which has the coldest. Buckets with the coldest data can be migrated to slow Tiers and bucket with the hot drops can be migrated to fast Tiers. Each bucket of storage must also keep with it a hot list of which drops of storage are referenced most often.

In general the hot list of drops may be a small subset; often as little as %0.1 of the drops in the bucket. Each entry in the hot list records information about how often a drop has been referenced and when it was last referenced. Each time a drop is referenced the system may query the hot list of drops for that bucket. If the drop is in the hot list, the number of references for the drop may be incremented. If the drop is not in the hot list, it may be added.

To add an entry, it may often be necessary to remove an entry. Entries are removed by finding an entry that has a low level temperature and has not been referenced recently. The hot list for most buckets may be rather small. Periodically the system may rank an ordering of buckets by temperature and it may migrate buckets of storage so that the hottest buckets are on the fast tiers and the cold buckets are on the slow tiers. Migrating a bucket of storage migrates all the drops in that bucket together.

When a single drop is referenced and the system updates the hot list entry for that drop, the system may check whether the temperature of that drop is more in line with another bucket than the current bucket. In that situation, a single drop may be migrated between buckets. The migration may move the hot list entry information to the new bucket as well. This may cause the hot drops to migrate out of a bucket so the bucket may get colder and the bucket may be migrated to a slow tier. This may result in combining hot drops together so they may form a hotter bucket that can be migrated to a fast tier. By constructing the hot list containing only a very small subset of the drops and basing the comparison of drop temperatures with bucket temperatures, the resources needed to handle the migration are kept to a minimum.

Data Storage System Terminology

With respect to the current techniques in general, the following definitions may be particularly useful. A disk may be a physical disk within the storage system. A LUN may be a logical unit number which is an identifier for a Logical Unit. As well, each slice of data may have a mapping on the location of the physical drive where it starts and ends; a slice may be sliced again. A slice may also be divided into a slivers.

Data migration, i.e., the moving of data from one storage element to another, may be performed at the LUN level, the slice level, or the sliver level. Data migration at the slice level may be performed using the current techniques which commonly copy the data then update the map with the new location. With respect to the current techniques, this may require adding temperature statistics to slices within pools. In addition to considering temperature distributions between tiers, slices may also be migrated within tiers to redistribute workload on disk This type of slice migration may apply to both LUNs with either a fine or course map. Data migration using the current techniques may also occur at the sliver (i.e., block/page) level. This may require keeping statistics about the hot slivers in each slice and migrating the hot slivers out of cool slices. As well, cooler slices can be migrated to slower tier of storage.

Data Storage System

Figure 1:
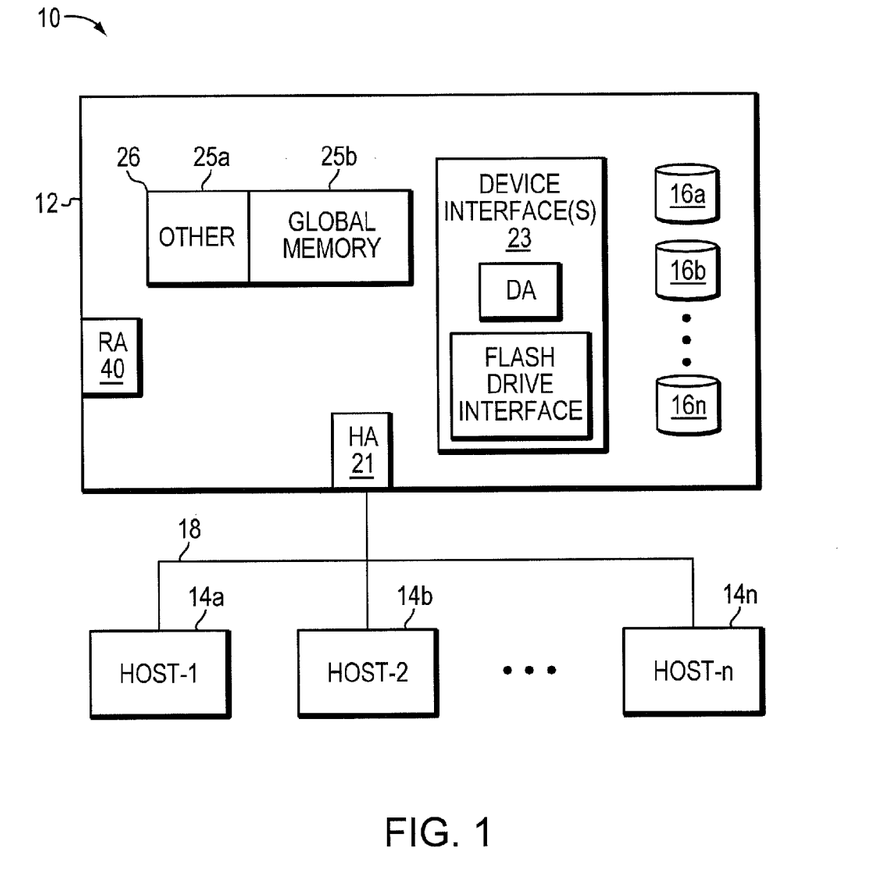
FIG. 1 is an example of an embodiment of a system that may utilize the techniques described herein.

Referring to FIG. 1, shown is an example of an embodiment of a system that may be used in connection with performing one or more implementations of the current techniques described herein. The system 10 includes a data storage system 12 connected to host systems 14*a*-14*n* through communication medium 18. In this embodiment of the computer system 10, the n hosts 14*a*-14*n* may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel (FC), iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment. Other configurations may used other storage arrays to physical storage for a storage array.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical units (LU). The LUs may or may not correspond to the actual physical devices or drives 16a-16n. For example, one or more LUs may reside on a single physical drive or multiple drives, or a variety of subsets of multiple drives. Data in a single data storage system, such as a single data storage array, may be accessed by multiple hosts allowing the hosts to share the data residing therein. The map kept by the storage array may associate host system logical address with physical device address.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ data storage array and/or a CLARiiON® data storage array by EMC Corporation of Hopkinton, Mass. In the foregoing data storage array, the data storage devices 16a-16n may include a combination of disk devices and flash devices in which the flash devices may appear as standard Fibre Channel drives to the various software tools used in connection with the data storage array. The disk devices may be any one or more different types of disk devices such as, for example, an ATA disk drive, FC disk drive, and the like. The flash devices may be constructed using different types of memory technologies such as nonvolatile semiconductor NAND flash memory forming one or more SLC (single level cell) devices and/or MLC (multi level cell) devices. Additionally, flash memory devices and disk devices are two exemplary types of devices that may be included in a data storage system used in connection with the techniques described herein.

Thus, the storage system may be made up of physical devices with different physical and performance characteristics (e.g., types of physical devices, disk speed such as in RPMs), RAID levels and configurations, different replication services (such as particular software used in the data storage system providing data replication), allocation of cache, processors used to service an I/O request, and the like.

The dynamic aspects may include, for example, aspects related to current I/O performance such as AST (average service time) representing the average amount of time it takes to service an event (e.g., service an I/O request), ART (average response time) based on the AST, and the average amount of time the I/O request waits. Dynamic aspects may also include, for example, utilization of different data storage system resources (e.g., particular logical or physical devices, CPU), measurement of cache hits and/or misses, and the like. The dynamic aspects may vary with application workload, such as when particular applications may be more heavily performing I/O operations.

Given the different performance characteristics, one or more tiers of storage devices may be defined. The physical devices may be partitioned into tiers based on the performance characteristics of the devices; grouping similar performing devices together. An embodiment using the techniques herein may define a hierarchy of multiple tiers. A set of data storage resources, such as logical and/or physical devices, a portion of cache, and services, such as a software vendor's service for providing data replication, may be bound to, or designated for use by, consumers in a particular tier.

Conversely, the particular performance characteristics may be applied to a storage pool with or without the definition of tiers. That is, the system may group devices within a storage pool by their characteristics with or without explicitly creating a set of tiers and may instead develop a more hybrid method or creating a hierarchy based on the performance characteristic of the storage devices.

The set of resources associated with or designated for use by a tier or grouping within a pool may be characterized as a dynamic binding in that the particular set of data storage system resources utilized by consumers in a tier may vary from time to time. In accordance with the current techniques, a current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system at different points in time.

Figure 2:
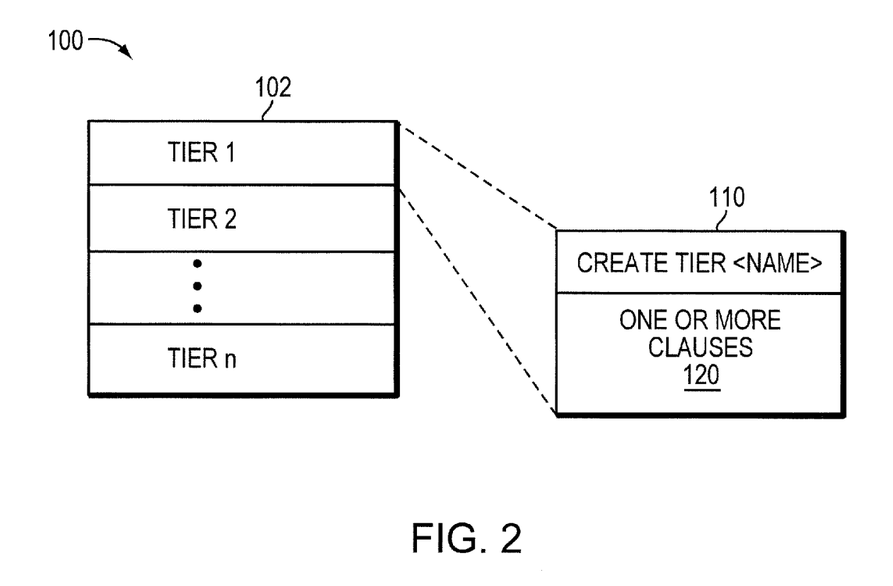
FIG. 2 is an embodiment of storage tiering.

Referring to FIG. 2, shown is an example illustrating tiers. The example 100 includes a set of one or more tiers 102. Each tier, such as tier 1, may be creating by specifying a tier definition 110. In at least one embodiment, the tier definition 110 may include one or more lines of text in a language which may be subsequently processed by code on the data storage system. The tier definition 110 defines a tier indicated by <NAME>. The tier definition may include one or more clauses 120. As described above, the clauses of 120 may include one or more goal clauses and/or one or more configuration clauses.

Given that a storage system may be divided into tiers and that each tier can have different performance characteristics, the current techniques enable management of data migration across the tiers. As described herein, the current techniques may facilitate migration of the hot data to the faster tiers and may migrate the cold data to the slower tiers.

Current Techniques

One of the goals of storage system may be to increase cost effectiveness of the storage system by using different types of storage such as a mix of SSD, FC, SATA; maybe only SSD and SATA devices. Data may be migrated across these devices to give good performance with improved cost and total cost of ownership (TCO). These devices may be partitioned into pools. The pools can be divided into slices, which represent a piece of the logical unit, which in turn represents a portion of the physical storage of the device. Each slice in turn, may be divided into a number of slivers. As well, groups of device may belong to a storage tier based on its performance capabilities.

A goal in data storage may be to create a storage system, comprising storage devices of varied performance characteristics, that emulates a storage system comprising just the fastest performing devices. A way to implement this migration is through the use of temperature of data (hot data is used more often) to drive migration. In general, in accordance with the current techniques, hot data is migrated to faster (and typically more expensive) storage and cool data is migrated to slower (and typically less expensive) storage. Migrating the hottest, most accessed, data to fastest storage to give better performance for the user while migrating the coldest data to less expensive storage gives improved TCO for the user.

Use of the current techniques can help provide such a system by migrating or moving the most used data to the quicker storage to improve user performance. The current techniques help enable this by categorizing data as hot or cold and migrating the hotter data to a tier with better performance data and migrating the less used colder data to a slower tier. The current techniques also help enable this to be an automated migration occurring without user management. The temperature of data is determined by analyzing how often that data is accessed. For example, the temperature may be given by a mapping corresponding to the number of times a particular slice of data was accessed in a given second or it may correspond to the response time of the accesses to the data or a combination of one or more of these attributes. Some implementations may choose to collect data only during time periods that are of particular interest; these maybe be setup by operator configuration or determined by host or storage system behavior. In addition, the temperature may, but need not, be further processed by taking the average of the calculated temperatures over a given period of time or may be calculated using exponential decay.

A storage pool may be a collection of disks, which may include disks of different types. Pools may subdivided into slices; for example a 1 GB slice may be the allocation element for a logical unit with a course map or and a logical units with a fine map. As well, a pool may be use synonymously with a storage tier. That is, both a storage tier and a pool may have storage devices of different performance capabilities and costs. As well, both may contain slices and slivers. A slice may provide a container for many slivers, where a sliver may be an 8 kb "page" managed by MLU. A sliver may also be considered the smallest element that can be tracked and moved.

The current techniques may enable mapping and migration of slices and slivers. For example, the slice may be similar to the aforementioned buckets and the slivers may be similar to the aforementioned drops. Drops or slivers may be moved from bucket to bucket, e.g. slice to slice, and buckets, e.g. slices, may be moved from LUN to LUN.

For example, in some embodiments statistics may be kept on slices for drive migration. As well or instead, the average temperature of each sliver in a slice may be kept. The temperature for a given slice may be the average temperature for either all or some of the slivers in that slice. For example, in some embodiments, a hot list of slivers may be kept. It may be this hotlist that may be used to determine the average temperature of the slice. Further, the slices may be ranked by the temperature of that slice. This can help enable the migration of colder slices to slower disks.

For example, statistics may be kept on a subset of slivers and a hot list of last referenced slivers in a slice. A hot list may be made up a fraction of the total number of slivers of a slice; for example, the hotlist may be 0.2 percent of the slivers in a slice. The size of this hotlist may also be variable; for example it could be from 500 slivers to 32,000 k slivers, wherein a slice may be made up of 128,000 slivers. The hot list may identify hot slivers that are candidates to be migrated to a hot slice.

Moving hot slivers out of a slice may make the average temperature of the slice cooler so the slice can migrate to a slower disk.

In may be important to consider the case where a hot slice or sliver has reached the fastest storage tier. It is not possible to move the hottest slivers out of such a slice, or hottest slice out of the LUN, because there is no faster medium to which they may be moved. With respect to this case, it may be useful to keep a larger hot list; e.g., expand the list of monitored slivers or slices. Other implementations might used a different scheme for differentiating the hot and cold slivers of the hottest slice such as a bit map. This way, the colder slivers among the hottest slivers or coldest slivers in theses especially hot slices may be moved out when these particular slice are filled.

In a particular embodiment, when slivers are moved from slice to slice, holes are left within the slice. Therefore, it may be useful to combine slices in a compaction operation. It may be further useful to leverage a strategy to combine the coldest slices together. It may be important to ensure that hot slivers are not moved into cold slices. Compaction of the holes can also reorder slices and slivers to improve sequential access and rebalance disks to mitigate hot spots. Since compaction reads data into memory, it may provide a good opportunity to examine data to check for ability to do compression and/or de-duplication.

In at least some embodiments of the current techniques, the scheduled migration of data may be used as a time to perform several actions of value on the data. For example, the slices may be relocated to mitigate hot spots. The storage pools may be expanded and the data re-distributed across the new pools. The data may be re-sequenced for sequential access. The data may be examined for compression and/or de-duplication. Consolidating cold data together may organize the data for spinning down disks in a pool for the storage array equivalent of hybrid disks.

In at least some embodiments of the current techniques, a hierarchy of sizes of managed data may be created. Average statistics on large groups of small elements may be kept. A short hot list of statistics on individual elements may also be kept. Hot small elements may be migrated to consolidate hot elements together. Large groups with cooler elements can be migrated to slower storage.

In accordance with at least some embodiments of the current techniques, migration may be based on relative temperatures so migrations can be initiated as the fastest tiers become full as well as at off peak times. In previous strategies, migrations may have been delayed until off peak time so long as tiers have enough room. A further benefit, the current techniques do not need to limit temperature collection to specific times to avoided maintenance activities such as a backup operations that touch everything; as the backup affects everything pretty much evenly the relationship of hot and cold slices may not be impacted.

This techniques for data migration can result in good access performance with fewer spinning spindles. This may make bulk storage drives more useable. The migration techniques are quite flexible and applicable to different workloads. As well, the rate of temperature change of slices may be monitored and used to predict future migration. Specifically, patterns may be examined to predict cool slices or when hot slices become cool.

The action of separating cold data from hot data may create a situation that will enable the devices with the cold slices to be spun down. The Storage Array may allows specified disks to spin down which the storage array can facilitate by only placing extremely cold data on the disks that intended to spin down or spin at reduce speeds.

The current techniques allow for identification and migration of data on running system without user intervention. This relies on differentiation of hot and cold data. This information can also help identify data to put on green drives, which may spin at reduced speeds.

The current techniques can also be at least part of a solution to help mitigate overloaded drives. For example, consider conventional migration strategies. Conventional migration strategy is to use LUN migration to rebalance workload. However, this conventional strategy may be limited in that LUN migration has the granularity of the LUN which provides only a course ability to distribute load. A migration strategy to migrate slices within a storage pool enables slices to be migrated to redistribute workload on disk. This may allow part of the work load of the LUN to be on some disks while other parts of the work load can be on other physical disks. This can apply to LUNs with either a fine or course mapping. A further conventional type of migration strategy is Sliver (block/page) Migration.

By contrast, the current techniques may be applied to slice migration. Temperature statistics may be added to slices within a storage pool. Slice may be migrated to redistribute the workload not only to migrate colder data to slower storage tiers, but also to spread the hot data across the devices of the quicker storage tiers. Further, the same techniques may be applied to a sliver. That is, temperature statistics may be kept for each sliver and this data may be used to migrate data within slices and within LUNs. Slivers migration based on temperature data offers an advantage that this migration may be performed at a much higher level of granularity than that of slice migration.

Migration between storage tiers can be cost effective. Take for example the current market prices for different types of storage devices. A 15K 300 GB FC drive can cost about the same as a 7200 1 GB SATA drive. A DAE can cost twice as much as a FC or SATA drive, where a 73 GB SSD disk can cost twice as much as a DAE or 4 times as much as a FC. As well, two DAEs full of FC disks, with a capacity 9,000 GB can cost several times the cost of a 73 GB SSD disk. One DAE with equivalent SATA drives and some SDD storage with a capacity of 10,366 GB can cost about the same as the 73 GB SSD disk.

With respect to the input outputs per second (IOPS) for each of these devices currently, a SATA drive is roughly three times larger but only half as fast (in TOPS) as an FC drive. A SATA system has one third the number of spindles each with one half the IOPS, or about 16 of the TOPS of the FC system. One DAE with ten SATA drives has the capacity of 30 FC disks but only 16 percent of the TOPS. Conversely, one SSD has the same TOPS as 30 FC disks. A product using an SSD to enable quick access to the data would need to get hot data to fit in 4% of the available space on the SSD.

Using the current techniques, data migration for LUNs with a course map may be performed. The temperature of slices in the LUN shows differentiation. Applying the current techniques, the extremely hot slices may be identified and migrated to SSD. This migration, of the hot slices to the faster storage medium, yields better overall performance for the LUN. As well, if a large number of slices fall together with similar temperatures, these slices may stay on an FC drive. Other slices, that do not yet have temperature data associated with them, may be migrated to green drives.

In at least some embodiments of the current techniques, two, three, or more tiers of data storage devices, SSD, FC (with different RPM speeds), and SATA may be used. This may provide better response than a two tier approach that may consist of FC and SSD devices. Further, this may provide an even lower cost than a two tiered approach or than an all FC approach because the cold slices may be migrated onto a SATA device. The current techniques may function on any system, one with storage devices of different performance and cost characteristics as well as one with similar performance characteristics.

Figure 3:
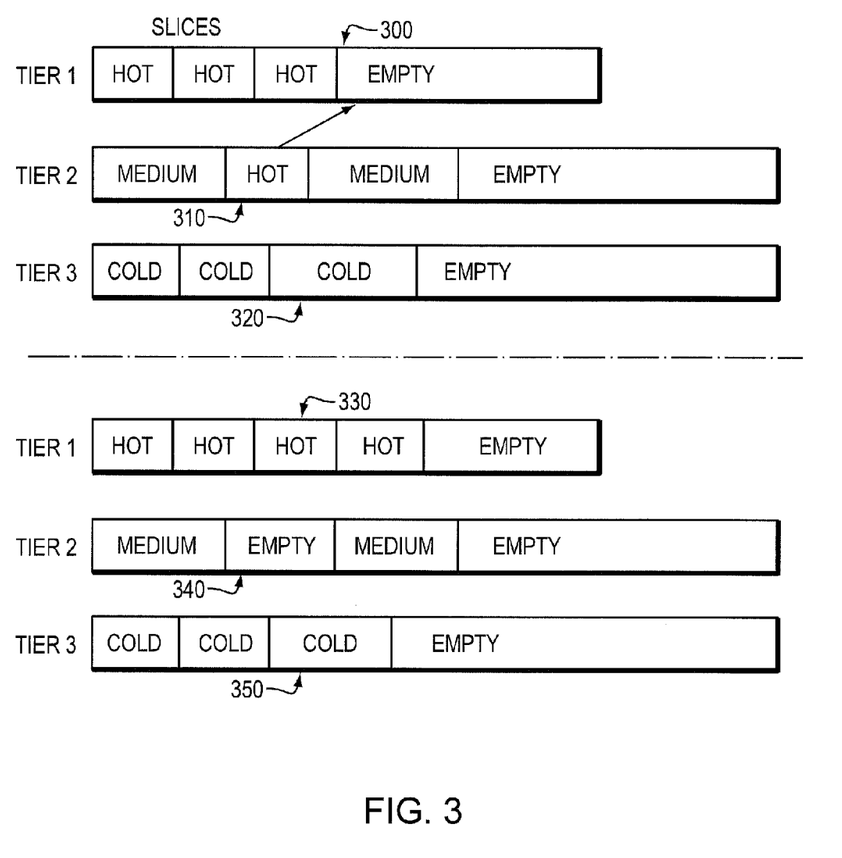
FIG. 3 is an embodiment of the current techniques.

Refer now to FIG. 3 which shows an example embodiment in accordance with the current techniques. In this figure, there are three tiers, tier 1, tier 2 and tier 3. Spread across these tiers are slices, such as slices 300, 310, and 320. As well, each slice has a temperature associated with it such as hot, cold, or medium. As well, some of the tier is also considered empty. Referring to the upper portion of the figure, there is a hot slice 310 in tier 2. The temperature of a slice may be designated as a scalar or step value, that is it may have a numerical equivalent such as 30 degrees or may simply be designated into a bucket, such as cold.

Also shown in this figure is that Tier 1 has empty space 300. In this example, Tier 1 may have faster performance characteristics and a higher cost. Conversely, Tier 2 may have slower performance characteristics but a lower cost. This may be seen, for example, in the fact that there is more storage in Tier 2 than there is in Tier 1. Again, in the upper portion, it is shown that there is a hot slice 310 in Tier 2 that should be moved to Tier 1. In this example embodiment, as shown in the lower portion of FIG. 3, the hot slice is moved to Tier 1 leaving an empty space 340 in Tier 2.

Figure 4:
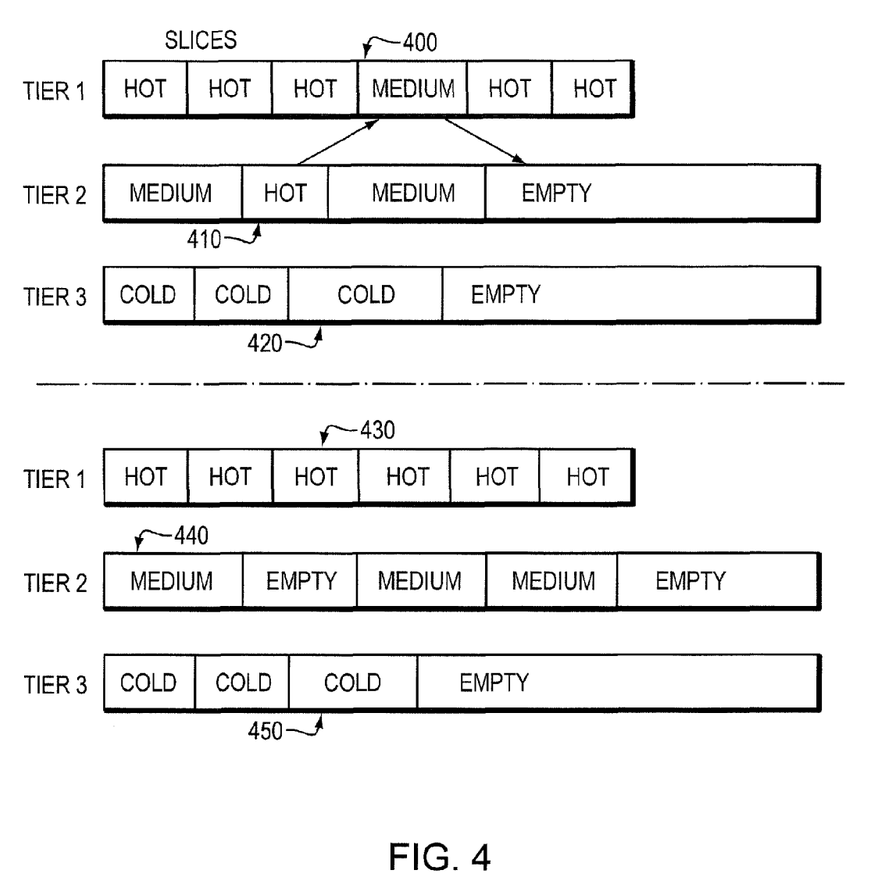
FIG. 4 is an alternative embodiment of the current techniques.

Refer now to FIG. 4. In this embodiment, there is a hot tier in Tier 2 and a medium slice in Tier 1; however, Tier 1 has no space to accommodate an additional tier. Therefore, in this embodiment, the medium slice 400 on Tier 1 is migrated to Tier 2 and the hot slice 410 in Tier 2 is migrated to Tier 1. Note, that it was the need to migrate the hot slice 410 to Tier 1 that caused the medium slice 400 to be shifted to Tier 2. In this example, it may have been more effective to have the medium slice located in Tier 1. Also note that slices may change temperature based on access requests. Therefore, a slice's temperature may rise or fall over time. The slice's temperature may be the result of any number of calculations based on access or write requests to that slice.

Figure 5:
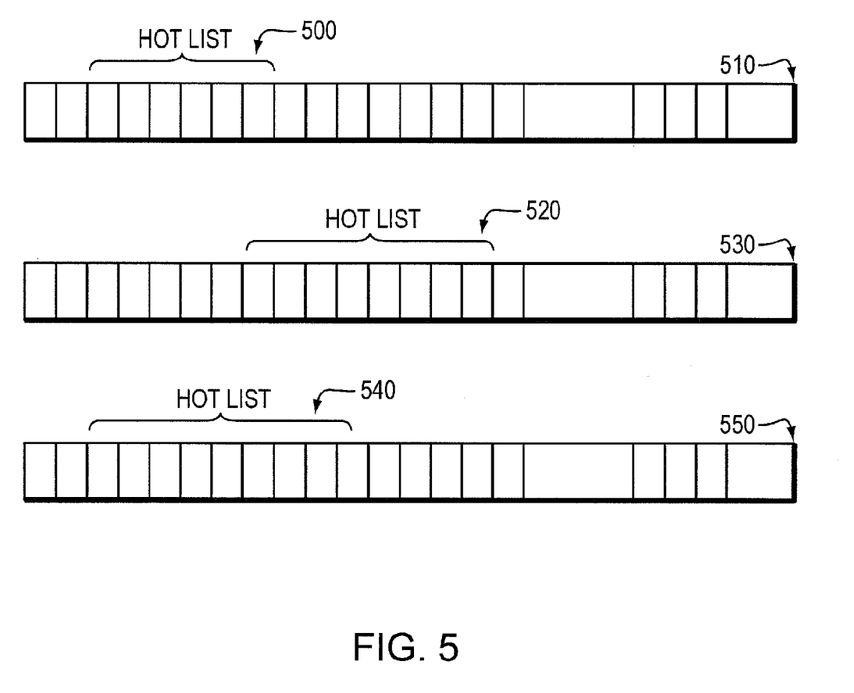
FIG. 5 is an embodiment of a hot list.

Refer now to FIG. 5. In this embodiment, three different slices are shown. Each slice is made up of slivers. For each particular slice, there are a number of slivers that have been selected. These slices make up the "hot list" for that particular sliver. The hot list for a sliver may be used to calculate the temperature for that sliver. As shown in slice 510, 530, and 550, the hotlists 500, 520, 540 may consist of a variable number of slivers or it may consist of a fixed number of slivers. For example, a hot slice or a slice with many hot slivers may have a relatively large hot list. Conversely, a cooler slice may have a smaller hot list and not track as many slivers.

Figure 6:
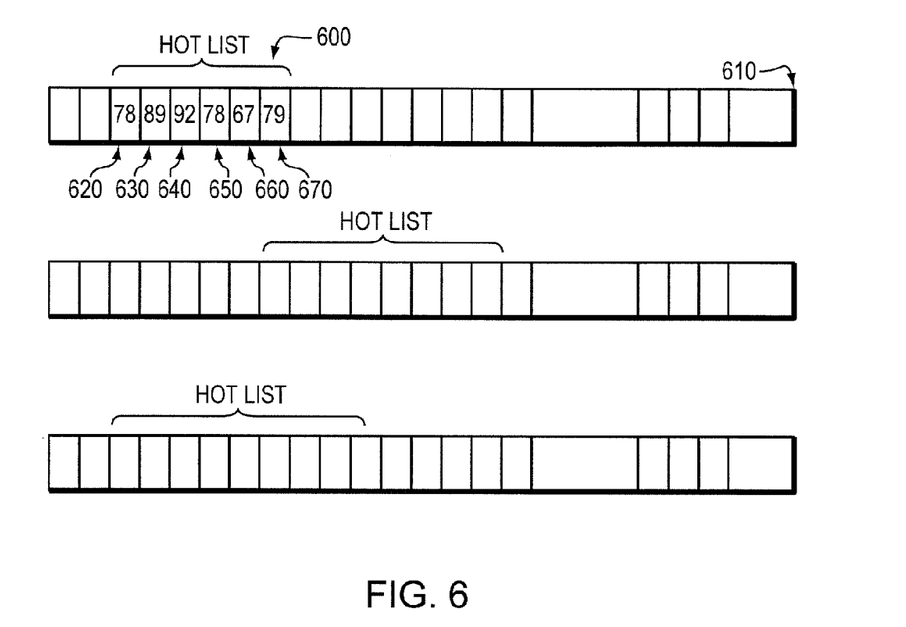
FIG. 6 is an alternative embodiment of a hot list.
Figure 7:
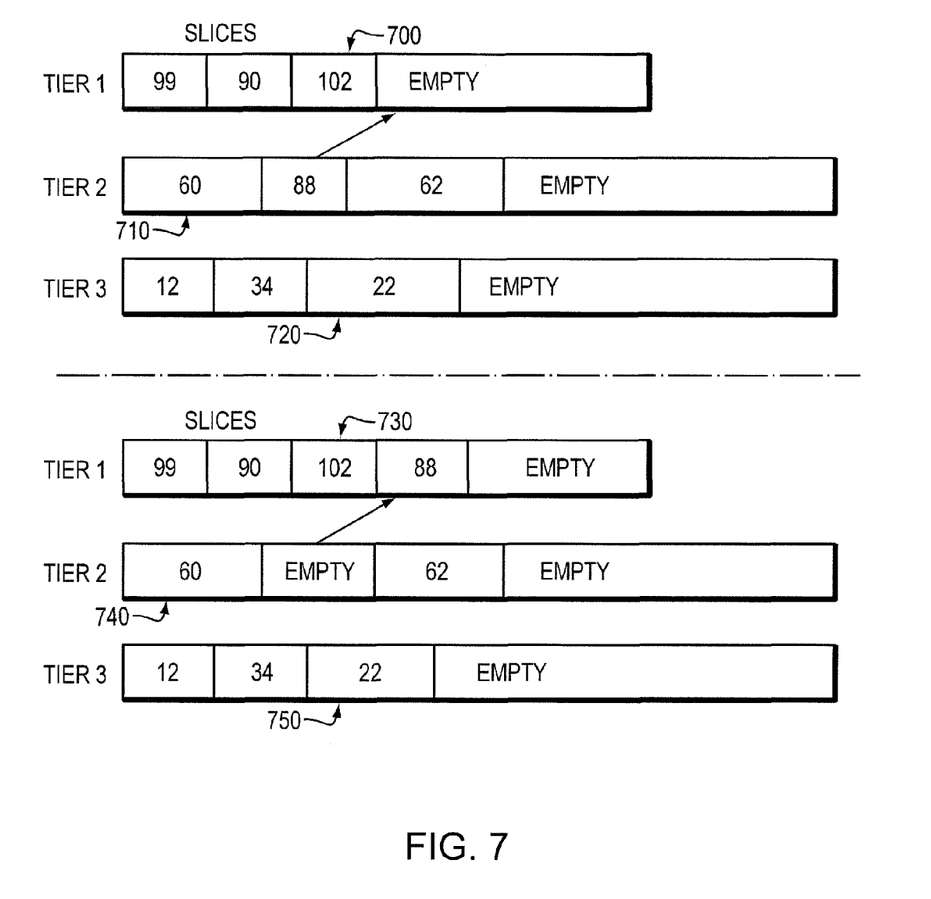
FIG. 7 is an embodiment of the current techniques applied to storage tiers.

Referring to FIG. 6, example values are given for the slices of the hotlist. These value per slice could be access requests per second, the average of the past X seconds of access requests, an exponential decay of access requests over the last X seconds, or any number of algorithms to determine a value for access requests to that sliver of data. The value of the hot list may be an average of the values of the values or temperatures for each of the slivers. The value for the hot list may also represent the value or temperature of the slice. Referring to FIG. 7, this example is an embodiment similar to that of FIG. 6, with numerical values instead of hot, cold and medium values.

Figure 8:
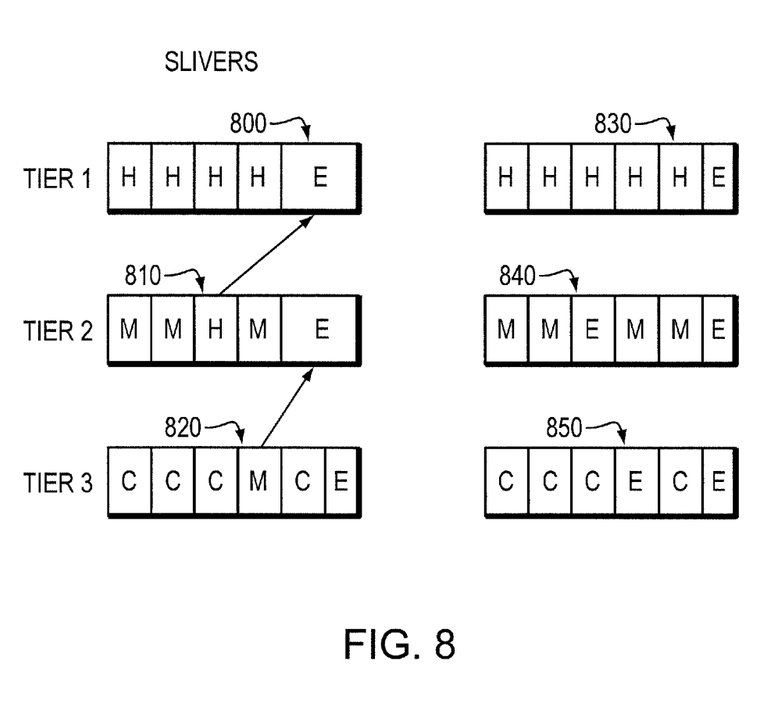
FIG. 8 is an alternative embodiment of the current techniques applied to storage tiers.

Referring to FIG. 8, this slide is an example of migrating slices, instead of the whole sliver. In general, hotter slices may be moved up to tiers with quicker performance characters similar to how slices are shifted. However, shifting of slices adds additional complexity in that this can create wholes within the slices.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for migrating data between storage devices of a data storage system, the method comprising:
   grouping the storage devices of the data storage system into one or more storage pools, wherein the storage devices comprise a fast storage device, a medium storage device, and a slow storage device;
   assigning addressable elements of the storage devices of the one or more storage pools to slices and slivers, each of the slivers being a respective portion of a respective slice; wherein each slice represents a slice of a logical unit (LUN) of one or more of the storage devices in the one or more storage pools;
   associating a value list with each of the slices of the one or more storage devices, wherein each value is derived from attributes of access requests to each of the slices;
   determining a hot list for each of the slices within each respective one or more storage pools, wherein the hot list corresponds to a set of slivers in a slice that are more frequently referenced than a determined threshold, wherein a hot list value represents an average value of the set of slivers in the respective hotlist; determining whether the value of each sliver of the hot list is closer to another hot list value in another slice in another one or more storage pools compared to the associated value of the respective slice to which the sliver is a member; and
   based on a positive determination of whether the value of each member of the hot list is closer to the associated value of another hot list in another slice, migrating the data associated with the slivers of the hot list that more closely match the value of slivers of the hot list of another slice in each respective one or more storage pools by migrating the data of the slices between the storage pools, and wherein the value of each slice is maintained after slice migration to another storage pool.

2. The method of claim 1 wherein the fast storage device has faster access speeds than the medium storage device, and wherein the medium storage device has faster access speeds than the slow storage device; the method further comprising:
   wherein the data of a slice stored on the slow storage device with a higher value than the values of the data of the slices on the fast medium storage device is migrated to the fast medium storage device from the slow storage device; wherein the data of a slice stored on the medium storage device with a higher value than the values of the data of the slices on the fast storage device is migrated to the fast storage device from the medium storage device.

3. The method of claim 1 wherein the values of the slices are sorted and the slices stored on the slower storage device in the one or more storage pools with the higher values than the slices on the faster storage devices are migrated to storage devices with faster access speeds from the storage devices with slower access speeds.

4. The method of claim 2 further comprising:
examining the value list for each sliver and migrating the sliver with the highest corresponding value in the value list to a slice on the fast storage device.

5. The method of claim 1 wherein the fast storage device has faster access speeds than the slow storage device; further comprising:
examining the value list for each sliver and migrating the sliver with the lowest corresponding value in the value list to a slice on the slow storage device.

6. A program product for migrating data between storage devices of a data storage system comprising:
a non-transitory computer-readable storage medium encoded with computer-executable program code enabling:
grouping the storage devices of the data storage system into one or more storage pools, wherein the storage devices comprise a fast storage device, a medium storage device, and a slow storage device;
assigning addressable elements of the storage devices of the one or more storage pools to slices and slivers, each of the slivers being a respective portion of a respective slice; wherein each slice represents a slice of a logical unit (LUN) of one or more of the storage devices in the one or more storage pools;
associating a value list with each of the slices of the one or more storage devices, wherein each value is derived from attributes of access requests to each of the slices;
determining a hot list for each of the slices within each respective one or more storage pools, wherein the hot list corresponds to a set of slivers in a slice that are more frequently referenced than a determined threshold, wherein a hot list value represents an average value of the set of slivers in the respective hotlist; determining whether the value of each sliver of the hot list is closer to another hot list value in another slice in another one or more storage pools compared to the associated value of the respective slice to which the sliver is a member; and
based on a positive determination of whether the value of each member of the hot list is closer to the associated value of another hot list in another slice, migrating the data associated with the slivers of the hot list that more closely match the value of slivers of the hot list of another slice in each respective one or more storage pools by migrating the data of the slices between the storage pools, and wherein the value of each slice is maintained after slice migration to another storage pool.

7. The program product of claim 6 wherein the fast storage device has faster access speeds than the medium storage device, and wherein the medium storage device has faster access speeds than the slow storage device; the code further enabling:
wherein the data of a slice stored on the slow storage device with a higher value than the values of the data of the slices on the fast medium storage device is migrated to the fast medium storage device from the slow storage device; wherein the data of a slice stored on the medium storage device with a higher value than the values of the data of the slices on the fast storage device is migrated to the fast storage device from the medium storage device.

8. The program product of claim 6 wherein the values of the slices are sorted and the slices stored on the slower storage device in the one or more storage pools with the higher values than the slices on the faster storage devices are migrated to storage devices in the one or more storage pools with faster access speeds from the storage devices with slower access speeds.

9. The program product of claim 6 the code further enabling:
examining the value list for each sliver and migrating the sliver with the highest corresponding value in the value list to a slice on the fast storage device.

10. The program product of claim 6 wherein the fast storage device has faster access speeds than the slow storage device; the code further enabling:
examining the value list for each sliver and migrating the sliver with the lowest corresponding value in the value list to a slice on the slow storage device.

11. A system comprising:
a computer having a memory and a processor;
computer-executable program code operating in the memory on the processor, wherein the computer-executable program code is configured to enable a processor to execute the following:
grouping the storage devices of the data storage system into one or more storage pools, wherein the storage devices comprise a fast storage device, a medium storage device, and a slow storage device;
assigning addressable elements of the storage devices of the one or more storage pools to slices and slivers, each of the slivers being a respective portion of a respective slice; wherein each slice represents a slice of a logical unit (LUN) of one or more of the storage devices in the one or more storage pools;
associating a value list with each of the slices of the one or more storage devices, wherein each value is derived from attributes of access requests to each of the slices;
determining a hot list for each of the slices within each respective one or more storage pools, wherein the hot list corresponds to a set of slivers in a slice that are more frequently referenced than a determined threshold, wherein a hot list value represents an average value of the set of slivers in the respective hotlist; determining whether the value of each sliver of the hot list is closer to another hot list value in another slice in another one or more storage pools compared to the associated value of the respective slice to which the sliver is a member; and
based on a positive determination of whether the value of each sliver of the hot list is closer to the associated value of another hot list in another slice, migrating the data associated with the slivers of the hot list that more closely match the value of slivers of the hot list of another slice in each respective one or more storage pools by migrating the data of the slices between the storage pools, and wherein the value of each slice is maintained after slice migration to another storage pool.

12. The system of claim 11 wherein the fast storage device has faster access speeds than the medium storage device, and wherein the medium storage device has faster access speeds than the slow storage device; the code further configured for execution of:
wherein the data of a slice stored on the slow storage device with a higher value than the values of the data of the slices on the fast medium storage device is migrated to the fast medium storage device from the slow storage device; wherein the data of a slice stored on the medium storage device with a higher value than the values of the data of the slices on the fast storage device is migrated to the fast storage device from the medium storage device.

13. The system of claim 11 wherein the values of the slices are sorted and the slices stored on the slower storage device in the one or more storage pools with the higher values than the slices on the faster storage devices are migrated to storage devices with faster access speeds from the storage devices with slower access speeds in the one or more storage pools.

14. The system of claim 11 the code further configured for execution of:
   examining the value list for each sliver and migrating the sliver with the highest corresponding value in the value list to a slice on the fast storage device.

15. The system of claim 11 wherein the fast storage device has faster access speeds than the slow storage device; the code further configured for execution of:
   examining the value list for each sliver and migrating the sliver with the lowest corresponding value in the value list to a slice on the slow storage device.

* * * * *